(12) United States Patent
Zhou (10) Patent No.: US 6,621,632 B2
(45) Date of Patent: Sep. 16, 2003

(54) OPTICAL INTERFEROMETER FOR DEMULTIPLEXING AN OPTICAL SIGNAL

(75) Inventor: Gan Zhou, Plano, TX (US)

(73) Assignee: Chorum Technologies LP, Richardson, TX (US)

( * ) Notice: Subject to any disclaimer, the term of this patent is extended or adjusted under 35 U.S.C. 154(b) by 0 days.

(21) Appl. No.: 09/840,524

(22) Filed: Apr. 23, 2001

(65) Prior Publication Data

US 2002/0154411 A1 Oct. 24, 2002

(51) Int. Cl.[7] .............................. G02B 27/00; H04J 14/02
(52) U.S. Cl. ..................... 359/577; 359/634; 359/580; 359/589; 359/127
(58) Field of Search .............................. 359/634, 127, 359/580, 577, 589

(56) References Cited

U.S. PATENT DOCUMENTS 6,130,971 A   10/2000  Cao
6,144,494 A   11/2000  Shirasaki et al.
6,163,393 A   12/2000  Wu et al. .................... 359/127
6,169,604 B1 * 1/2001  Cao ............................ 356/519
6,421,478 B1 * 7/2002  Paiam ......................... 385/24

* cited by examiner

Primary Examiner—John Juba
Assistant Examiner—Fayez Assaf
(74) Attorney, Agent, or Firm—Baker Botts L.L.P.

(57) ABSTRACT

An apparatus for processing an optical signal includes a tunable optical element and a reflective element. The tunable optical element receives an input signal at an incidence angle and separates the input signal into a first beam having a first optical path length and a second beam having a second optical path length. The difference between the first optical path length and the second optical path length is based at least in part upon the incidence angle of the input signal. The reflective element reflects the first beam and the second beam such that the first beam interferes with the second beam to produce a first output signal and a second output signal. The first output signal comprises a first subset of wavelength channels from the input signal and the second output signal comprises a second subset of wavelength channels from the input signal.

100 Claims, 6 Drawing Sheets

OPTICAL INTERFEROMETER FOR DEMULTIPLEXING AN OPTICAL SIGNAL

FIELD OF THE INVENTION

The present invention relates generally to the field of optical communications systems. More specifically, the present invention discloses an optical interferometer for demultiplexing an optical signal.

BACKGROUND OF THE INVENTION

Wavelength division multiplexing is a commonly used technique that allows the transport of multiple optical signals, each at a slightly different wavelength, over an optical fiber. The ability to carry multiple signals on a single fiber allows that fiber to carry a tremendous amount of traffic, including data, voice, and digital video signals. For example, the International Telecommunications Union (ITU) Draft Recommendation G.mcs proposes a frequency grid which specifies various channel spacings including 100 GHz and 200 GHz.

Interferometers can be used as wavelength routers to multiplex or demultiplex optical signals for WDM communications. When performing the multiplexing function, an interferometer combines two input WDM signals, each containing sets of optical channels, into a single, more densely spaced output signal. When used as a demultiplexer, an interferometer separates an input WDM signal containing a plurality of optical channels at different wavelengths into two, more widely spaced sets of channels. In particular, interferometers can be employed to divide the spectral space evenly with alternating optical channels being directed to each output port (i.e., odd wavelength channels 1, 3, 5, 7, etc. are directed to a first output port, while even wavelength channels 2, 4, 6, etc. are directed to a second output port). This function has sometimes been called an optical interleaver. This function is inherently bi-directional and can also be used to multiplex two sets of input channels (containing the even and odd channels, respectively) into a single output signal.

One of the difficulties in making a practical interferometer is the stabilization of the optical path length in the device, which affects the wavelength stability of the device. Materials in the interferometer can change index of refraction and physical dimension when subjected to temperature and mechanical perturbations. In the past, others have resorted to temperature control of the optical cavity, compensation of material index change by making composites of dissimilar materials, and birefringent interferometers. In contrast, the present invention discloses an optical interferometer architecture that is stable, compact, and requires no temperature control.

SUMMARY OF THE INVENTION

One embodiment of the present invention is an apparatus for processing an optical signal that includes a tunable optical element and a reflective element. The tunable optical element receives an input signal at an incidence angle and separates the input signal into a first beam having a first optical path length and a second beam having a second optical path length. The difference between the first optical path length and the second optical path length is based at least in part upon the incidence angle of the input signal. The reflective element reflects the first beam and the second beam such that the first beam interferes with the second beam to produce a first output signal and a second output signal. The first output signal comprises a first subset of wavelength channels from the input signal and the second output signal comprises a second subset of wavelength channels from the input signal.

Another embodiment of the present invention is a method for processing an optical signal that includes receiving an input signal at an incidence angle. The method proceeds by separating the input signal into a first beam having a first optical path length and a second beam having a second optical path length. The difference between the first optical path length and the second optical path length is based at least in part upon the incidence angle of the input signal. The method concludes by interfering the first beam with the second beam to produce a first output signal and a second output signal. The first output signal comprises a first subset of wavelength channels from the input signal and the second output signal comprises a second subset of wavelength channels from the input signal.

Yet another embodiment of the present invention is an optical system that includes a demultiplexer network, an optical component coupled to the demultiplexer network, and a multiplexer network coupled to the optical component. The demultiplexer network demultiplexes an input WDM signal into a plurality of wavelength channels and includes a tunable optical element and a reflective element. The optical component processes a portion of the wavelength channels. The multiplexer network multiplexes a portion of the wavelength channels to generate an output WDM signal.

The following technical advantages may be achieved by some, none, or all of the embodiments of the present invention. An interferometer of the present invention provides an optical element that may be dynamically tuned to control the optical path lengths of the beams used in the operation of the interferometer. In this regard, the wavelength channel spacings of the resulting signals may be dynamically controlled whether the interferometer is used as a demultiplexer or a multiplexer. In this respect, the interferometer comprises a bi-directional device that allows for tunability, stability, and robust operation in a compact architecture.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
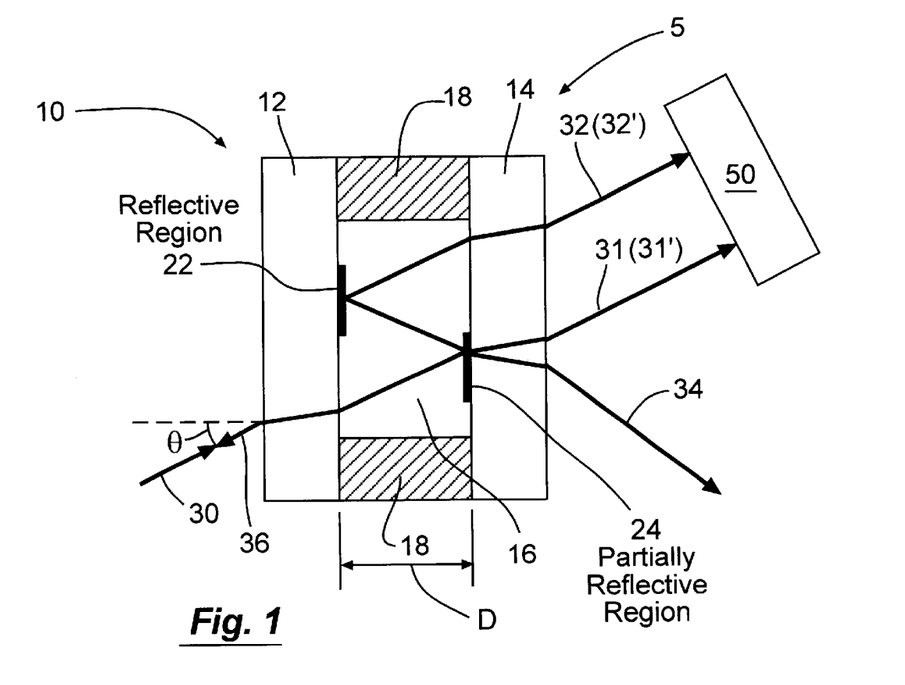
FIG. 1 illustrates one embodiment of an interferometer using a tunable optical element and a reflective element in accordance with the present invention.

FIG. 1 illustrates an interferometer 5 that includes a tunable optical element 10 and a reflective element 50. In general, interferometer 5 can be used to multiplex or demultiplex optical signals for WDM communications. When used as a demultiplexer, interferometer 5 separates an input WDM signal 30 containing a plurality of optical channels at different wavelengths into two, more widely spaced sets of channels in signals 34 and 36. When performing the multiplexing function, interferometer 5 combines two input WDM signals 34 and 36, each containing sets of optical channels, into a single, more densely spaced output signal 30. A particular advantage of interferometer 5 is that element 10 may be dynamically tuned to control the optical path lengths traveled by the beams used in the operation of interferometer 5.

Tunable optical element 10 comprises two parallel, transparent plates 12 and 14 that are separated by a gap 16 measuring a predetermined distance, D, using, in one embodiment, spacers 18. A reflective region 22 comprises at least a portion of the inner surface of the first plate 12. A partially reflective region 24 covers at least a portion of the inner surface of second plate 14. Any of a wide variety of conventional coating processes can be used to create the reflective and partially reflective regions 22 and 24 on the surfaces of the plates 12 and 14, respectively. Alternatively, discrete optical elements or layers can be attached to the plates 12 and 14 to create regions 22 and 24. Reflective element 50 comprises any suitable number and combination of mirrors, resonators, etalons, reflective gratings, prisms, filters, or any other suitable optical component or device that is operable to reflect some or all of an optical beam to element 10.

Although the following description of interferometer 5 is detailed with respect to a demultiplexer function, it should be understood that interferometer 5 applies similar principles and achieves similar advantages when operating as a multiplexer. In operation of interferometer 5 as a demultiplexer, element 10 receives an input signal 30. Input signal 30 comprises a wavelength division multiplexed (WDM) optical signal. In general, signal 30 includes multiple channels, each channel with its own range of wavelengths or frequencies. As used herein, the term "channel" refers to a particular range of wavelengths or frequencies that define a unique information signal. Each channel may or may not be evenly spaced from adjacent channels.

Input signal 30 passes through the first plate 12 and is incident on the partially reflective region 24 in a predetermined non-normal orientation (i.e., at an angle of incidence, θ). This produces a first beam 31 that is transmitted by the partially reflective region 24 and exits through the second plate 14. A portion of the input signal 30 is also reflected by the partially reflective region 24 to create a second beam 32. This second beam 32 is then reflected by the reflective region 22 on the first plate 12 so that it also passes through the second plate 14. The first and second beams 31 and 32 are parallel to one another as they exit the second plate 14 and propagate toward reflective element 50.

A difference in the optical path lengths between beams 31 and 32 results due to the internal reflections of the second beam 32 within the element 10. In general, the optical path length traveled by a beam 31 or 32 is defined as the summation of the optical thicknesses of all parts in the path, such as, for example, plate 14 and gap 16. The optical thickness of a part, such as plate 14 or gap 16, is defined as the physical thickness of that part multiplied by the index of refraction of the intermediate material. As described in greater detail below, by tuning the optical path lengths traveled by beams 31 and 32, the operating characteristics of interferometer 5 may be adjusted.

The parallel nature of beams 31 and 32 emitted by element 10 provide a technical advantage to interferometer 5. In particular, the difference in the optical path lengths between beams 31 and 32 are not sensitive to a change in distance between element 10 and element 50 since such a change impacts the optical path lengths traveled by both beams 31 and 32 substantially equally. This provides for easier alignment of element 10 with respect to element 50 during the manufacture of interferometer 5 as well as a more stable operation of interferometer 5.

Reflective element 50 reflects beams 31 and 32 back along their respective optical paths through element 10, so that the reflected beams 31 and 32 interfere at the partially reflective region 24 to produce output signals 34 and 36. In particular, the combination of reflection and transmission of beams 31 and 32 at reflective region 24 introduces a phase shift (e.g., a π phase shift) between the interfering beams 31 and 32 causing a first spectral component of input signal 30 to be output as signal 34 and a second spectral component of input signal 30 to be output as signal 36. For example, even wavelength channels from input signal 30 may be output as signal 34 and odd wavelength channels from input signal 30 may be output as signal 36. By tuning the optical path length differences between beams 31 and 32, as described below, the wavelength channel spacings of signals 34 and 36, as well as the center wavelengths of each respective channel, may be selectively determined and adjusted.

Regions 22 and 24 of element 10 are generally arranged on the inner surfaces of the parallel plates 12 and 14 as illustrated in FIG. 1. Because of this construction, beams 31 and 32 exiting the element 10 have traveled the same distance through plate 14. Therefore, the optical path length difference between the two beams 31 and 32 is independent of the material properties of plates 12 and 14. The optical path length difference, ΔL, may be characterized by the following equation:

$$\Delta L = 2 * n_{gap} * D * \cos\theta$$

where:

ΔL is the optical path length difference between beams 31 and 32;

D is the thickness of gap 16;

$n_{gap}$ is the index of refraction of the material within gap 16, such as, for example, air; and θ is the angle of incidence of the input signal 30.

In the embodiment depicted in FIG. 1, the space between the plates 12 and 14 is gap 16 and a fixed separation is maintained between the plates 12 and 14 by a set of spacers 18. Spacers 18 can be made of a low-expansion material such as Zerodur or ULE glass, both of which have a negligible amount of dimensional change with temperature. Therefore, the thickness of gap 16, D, is kept constant over a large range of temperature. The index of refraction of air is slightly temperature-dependent in an open environment (e.g., at constant air pressure). This dependence can be removed by enclosing the interferometer 5 in a sealed, air-tight enclosure which can be controlled to change the pressure selectively. Hence, the element 10 in FIG. 1 has an optical path length difference, ΔL, that is generally temperature-independent.

On the other hand, the optical path length difference, ΔL, can be tuned by changing the incidence angle, θ, or by adjusting the pressure in the gap 16 and, hence, the index of refraction of the material within the gap 16. The incidence angle, θ, may be adjusted by changing the path of signal 30 or by rotating the element 10 with respect to the path of signal 30. Therefore, a distance, D, may be selected for gap 16 that roughly achieves a particular wavelength channel spacing for signals 34 and 36. The incidence angle, θ, and/or the index of refraction of the material within gap 16, $n_{gap}$, may then be adjusted to fine tune the wavelength channel spacings of signals 34 and 36. The ability to roughly estimate a particular wavelength channel spacing for signals 34 and 36 combined with the ability to then fine tune this wavelength channel spacing results in a robust manufacturing process and subsequent operation of interferometer 5.

The following description details the operation of interferometer 5 as a multiplexer. For the purposes of this portion of the description, what was originally referred to as output signals 34 and 36 will be referred to as input signals 34 and 36. Similarly, input signal 30 will be referred to as output signal 30.

Element 10 receives input signals 34 and 36. Input signal 36 passes through the first plate 12 and is incident on the partially reflective region 24 in a predetermined non-normal orientation (i.e., at an angle of incidence, θ). This produces a first beam 31 that is transmitted by the partially reflective region 24 and exits through the second plate 14. A portion of the input signal 36 is also reflected by the partially reflective region 24 to create a second beam 32. This second beam 32 is then reflected by the reflective region 22 on the first plate 12 so that it also passes through the second plate 14. The first and second beams 31 and 32 are parallel to one another as they exit the second plate 14 and propagate toward reflective element 50.

Input signal 34 passes through second plate 14 and is incident on the partially reflective region 24 at an angle of incidence (not shown). This produces a third beam 31' that is reflected by the partially reflective region 24 and exits through plate 14. A portion of input signal 34 is also transmitted by the partially reflective region 24 to create a fourth beam 32'. This fourth beam 32' is then reflected by the reflective region 22 on the first plate 12 so that it also passes through the second plate 14. The third and fourth beams 31' and 32' are parallel to one another as they exit the second plate 14 and propagate toward reflective element 50.

In the embodiment illustrated in FIG. 1, first beam 31 and third beam 31' follow the same optical path toward reflective element 50 and have the same optical path length as each other. In this embodiment, second beam 32 and fourth beam 32' also follow the same optical path toward reflective element 50 and have the same optical path length as each other. A difference in the optical path lengths between beams 31 and 32, and between beams 31' and 32', results due to the internal reflections of the second beam 32 and fourth beam 32' within the element 10. As described above with respect to interferometer 5 operating as a demultiplexer, by tuning the optical path lengths traveled by beams 31 and 32, and beams 31' and 32', the operating characteristics of interferometer 5 may be adjusted.

Reflective element 50 reflects beams 31 and 32, and beams 31' and 32', back along their respective optical paths through element 10. At partially reflective region 24, reflected beam 31 interferes with beam 32 and reflected beam 31' interferes with beam 32' to produce output signal 30. In particular, the combination of reflection and transmission of beams 31, 32, 31', and 32' at reflective region 24 introduces a phase shift (e.g., a π phase shift) between the interfering beams 31, 32, 31', and 32' causing the spectral component of input signal 34 to combine with the spectral component of input signal 36 in output signal 30. For example, even wavelength channels from input signal 34 may combine with odd wavelength channels from input signal 36 to form output signal 30. In this regard, interferometer 5 may combine two input WDM signals 34 and 36, each containing one or more sets of optical channels, into a single, more densely spaced output signal 30.

The principles described above with respect to interferometer 5 operating as a demultiplexer apply to the interferometer 5 operating as a multiplexer. For example, the optical path lengths traveled by beams 31, 32, 31', and 32' and the appropriate differences between these optical path lengths, may be adjusted to adjust the operational characteristics of interferometer 5. In this respect, interferometer 5 comprises a bi-directional device that allows for tunability, stability, and robust operation in a compact architecture.

Figure 2:
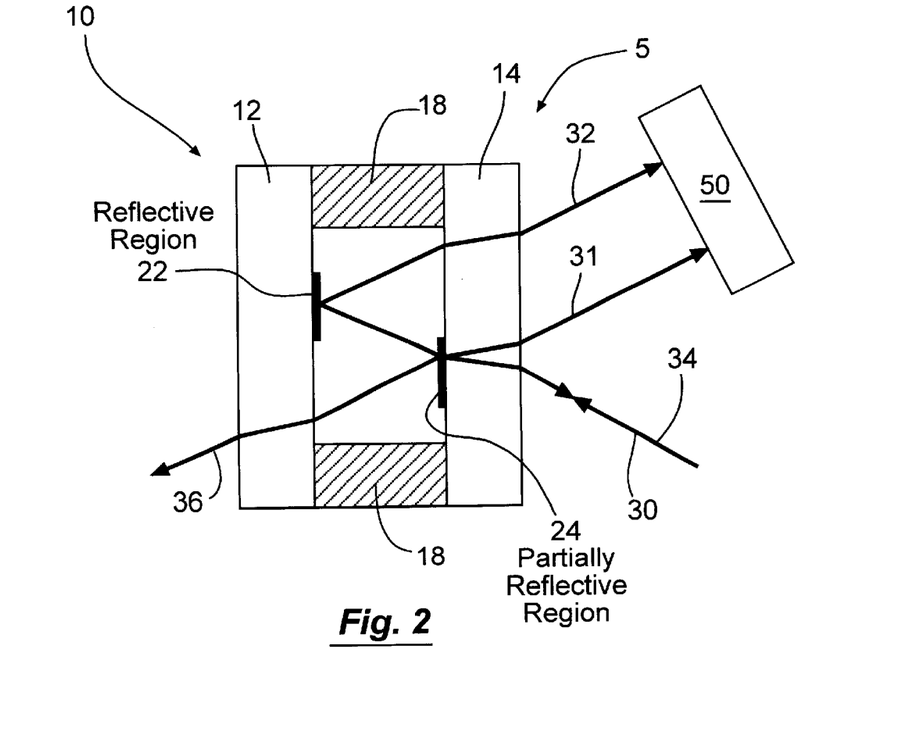
FIG. 2 illustrates another embodiment of the interferometer.

FIG. 2 illustrates another embodiment of the interferometer 5 in which the tunable optical element 10 uses a reflective geometry. In the embodiment illustrated in FIG. 2, the input signal 30 passes through the second plate 14 and is incident on the partially reflective region 24 on the inner surface of the second plate 14. A portion of the input signal 30 is reflected by the partially reflective region 24 and exits through the second plate 14 to produce the first beam 31. The remainder of the input signal 30 is transmitted through the partially reflective region 24 and the gap 16, and is then reflected by the reflective region 22 through the second plate 14 to produce the second beam 32. The remainder of operation for the embodiment illustrated in FIG. 2 is substantially similar to that of FIG. 1.

Figure 3:
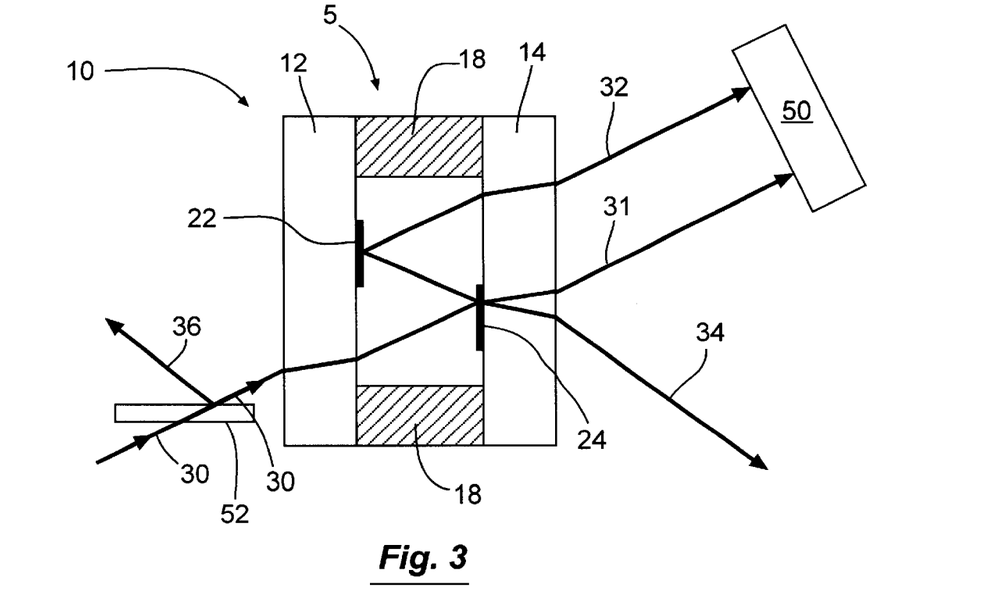
FIG. 3 illustrates the interferometer using a reflective element that isolates input and output signals.

FIG. 3 illustrates another embodiment of the interferometer 5 that includes reflective element 52 to isolate output signal 36 from input signal 30. Reflective element 52 comprises a mirror, a prism, or any other suitable optical component that redirects the optical path of output signal 36 as it propagates from element 10. In operation, input signal 30 propagates toward element 10 along a path that avoids reflective element 52 and is processed into output signals 34 and 36 as described above. Element 10 is positioned with respect to reflective element 52 such that output signal 36 is incident upon and reflected by reflective element 52 away from the source of input signal 30.

Figure 4:
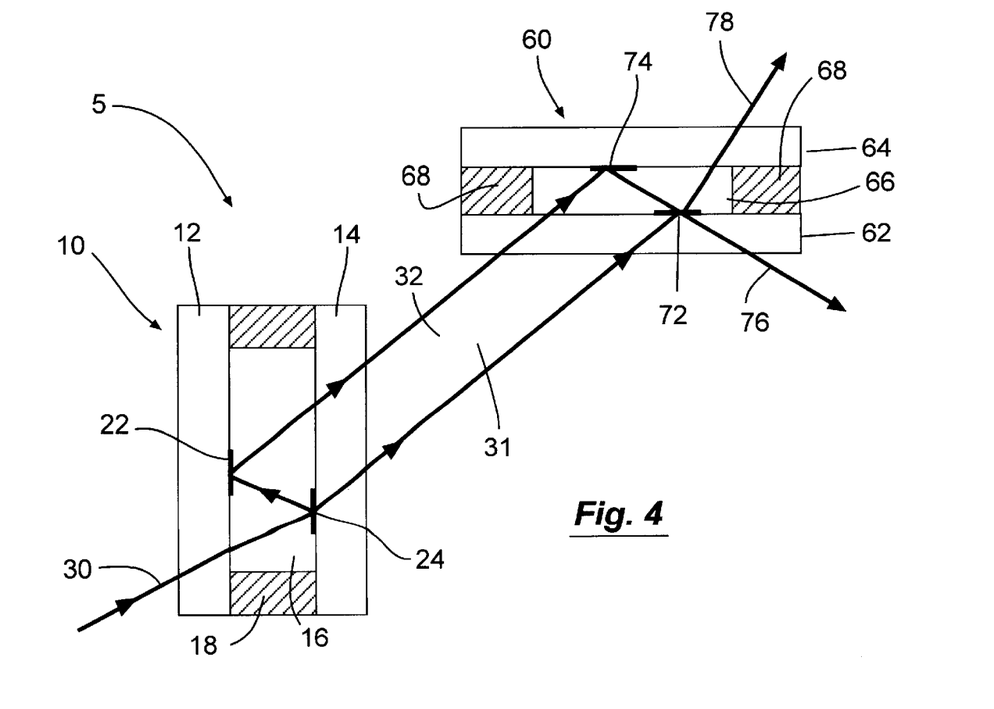
FIG. 4 illustrates one embodiment of the interferometer that includes a first tunable optical element and a second tunable optical element.

FIG. 4 illustrates another embodiment of interferometer 5 that includes a first tunable optical element 10 and a second tunable optical element 60. In general, element 60 is constructed similar to element 10. For example, element 60 comprises two parallel plates 62 and 64 separated by a gap 66 using spacers 68. Element 60 also includes a partially reflective region 72 and a reflective region 74 on portions of the inner surfaces of the plates 62 and 64, respectively.

In general, element 10 operates as described above with regard to FIG. 1. Thereafter, second beam 32 exiting element 10 passes through the first plate 62 of element 60 and is reflected by reflective region 74 onto the partially reflective region 72 on the inner surface of the first plate 62 of element 60. First beam 31 exiting element 10 passes through the first plate 62 of element 60 and strikes the partially reflective region 72 so that beams 31 and 32 interfere at the partially reflective region 72 to produce output beams 76 and 78. The combination of reflection and transmission of beams 31 and 32 at partially reflective region 72 introduces a phase shift (e.g., a π phase shift) between the interfering beams 31 and 32 causing a first spectral component of input signal 30 to be output as signal 76 and a second spectral component of input signal 30 to be output as signal 78. For example, even wavelength channels from input signal 30 may be output as signal 76 and odd wavelength channels from input signal 30 may be output as signal 78. A particular advantage of the embodiment of interferometer 5 illustrated in FIG. 4 is that signals 76 and 78 are forward propagating such that they are inherently isolated from input signal 30. This provides advantages in packaging and the arrangement of input and output ports for interferometer 5.

Like element 10, element 60 may also introduce a predetermined difference in the optical path lengths between the beams 31 and 32 before they strike the partially reflective coating 72. Therefore, by tuning one or both of elements 10 and 60, the optical path lengths of beams 31 and 32 may be controlled. In this regard, the wavelength channel spacings of signals 76 and 78, as well as the center wavelengths of each respective channel, may be selectively determined and adjusted.

Figure 5:
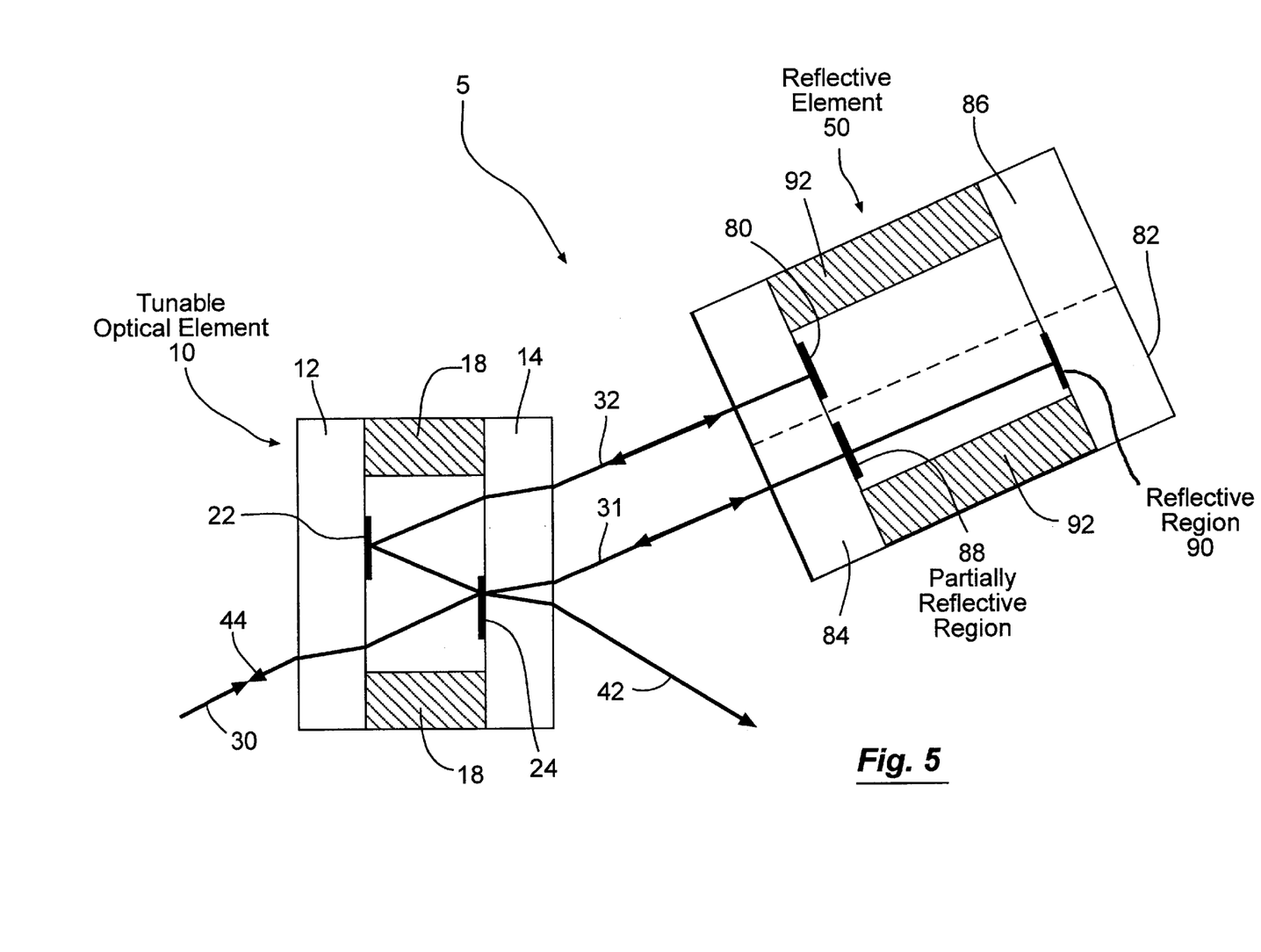
FIG. 5 illustrates one embodiment of the interferometer that includes a tunable optical element, a mirror, and a resonator.

FIG. 5 illustrates one embodiment of interferometer 5 in which reflective element 50 comprises a combination of a mirror 80 and a resonator 82. Resonator 82 may comprise a Gires-Tournois etalon with front and back layers 84 and 86 separated by an intermediate material in a gap having a predetermined optical thickness. In the particular embodiment of interferometer 5 illustrated in FIG. 5, mirror 80 is integrated with resonator 82 such that mirror 80 is disposed on the inner surface of the front layer 84. In another embodiment, mirror 80 may be arranged separate from resonator 82. With respect to resonator 82, a partially reflective region 88 is disposed on the inner surface of the front layer 84. A highly reflective region 90 is disposed on the inner surface of the the back layer 86. The spacers 92 of resonator 82 are made of low thermal expansion material. Other types of resonator or etalon structures could be readily substituted.

In general, element 10 operates as described above with regard to FIG. 1. Thereafter, second beam 32 exiting element 10 propagates toward and is reflected by mirror 80. A portion of first beam 31 is reflected by partially reflective region 88. The remaining portion of beam 31 propagates toward and is reflected by reflective region 90. The arrangement of partially reflective and reflective regions 88 and 90 associated with resonator 82 results in multiple reflections of beam 31 within the resonator 82. The resonator 82 reflects substantially all of the incident optical power back regardless of wavelength, but the group delay of the reflected light is strongly dependent on wavelength. The two reflected beams 31 and 32 from resonator 82 and mirror 80 retrace their respective optical paths and interfere at the partially reflective region 24 of element 10 to produce output beams 42 and 44. A reflective element 52 may be added to the interferometer 5 of FIG. 5 in order to isolate input signal 30 from output signal 44.

The combination of reflection and transmission of beams 31 and 32 at reflective region 24 introduces a phase shift (e.g., a π phase shift) between the interfering beams 31 and 32 causing a first spectral component of input signal 30 to be output as signal 42 and a second spectral component of input signal 30 to be output as signal 44. For example, even wavelength channels from input signal 30 may be output as signal 42 and odd wavelength channels from input signal 30 may be output as signal 44. By tuning the optical path length differences between beams 31 and 32, as described above, the wavelength channel spacings of signals 42 and 44, as well as the center wavelengths of each respective channel, may be selectively determined and adjusted.

As described above, the arrangement of partially reflective and reflective regions 88 and 90 associated with resonator 82 results in multiple reflections of beam 31 within the resonator 82. In response, the phase function of the reflected beam 31 becomes non-linear due to the multiple reflections of beam 31 within resonator 82. As a result, the relative phase shift between the two interfering beams 31 and 32 remains roughly constant over the spectral passband resulting in a flat top waveform for output signals 42 and 44.

Since the optical thickness of resonator 82 contributes to the wavelength channel spacings of signals 42 and 44, the optical path length differences between beams 31 and 32 determined by element 10 should be tuned with respect to resonator 82. To do so, the distance, D, of gap 16 of element 10 is controlled such that the optical path length difference between beams 31 and 32 introduced by element 10 is approximately one half of the optical thickness of resonator 82. In this regard, the pass bands and rejection bands of interferometer 5 are arranged at the appropriate wavelength channel spacings to generate the desired output signals 42 and 44.

Figure 6:
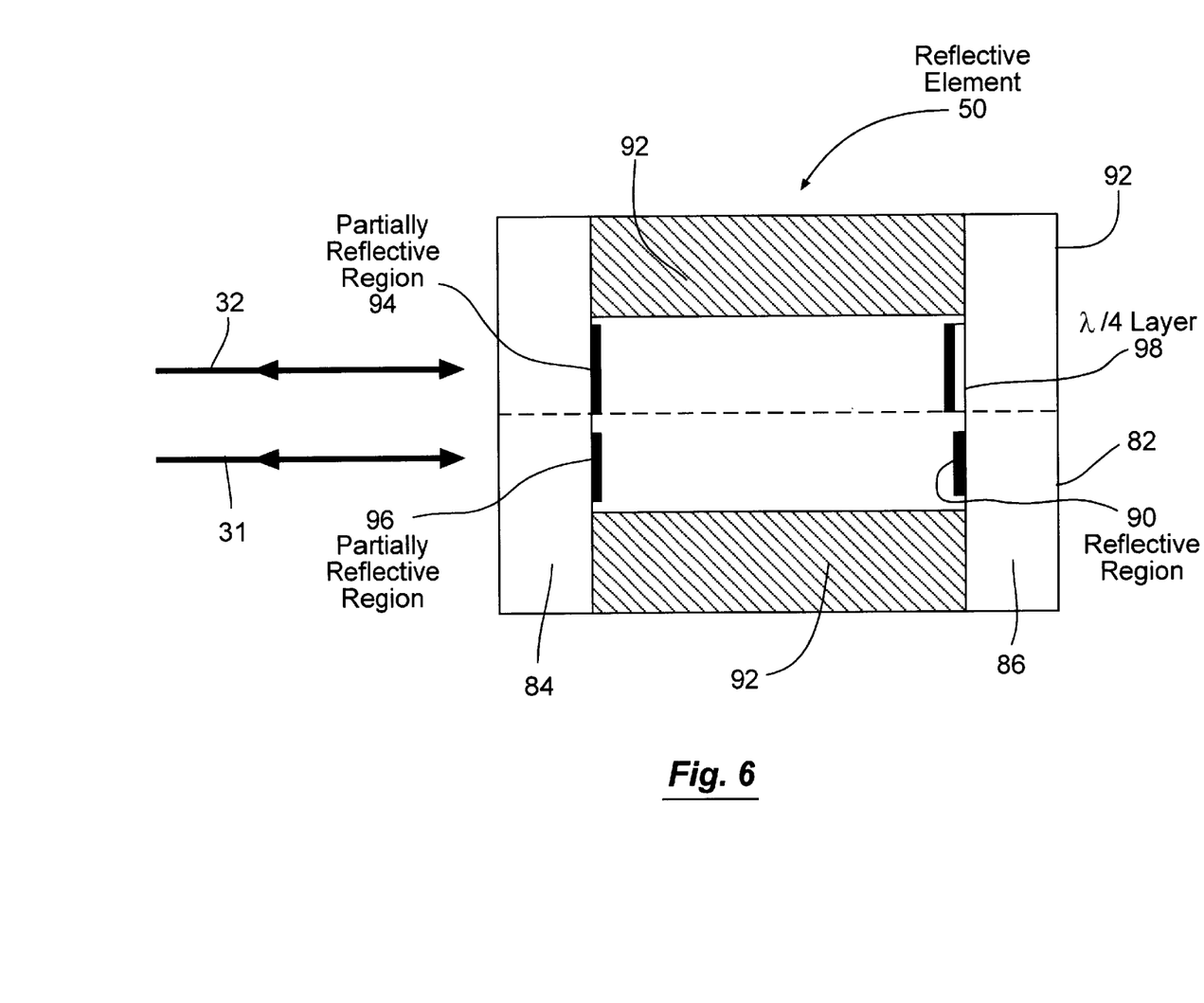
FIG. 6 illustrates one embodiment of the interferometer that includes a tunable optical element, a first resonator, and a second resonator.

The reflective element 50 illustrated in FIG. 5 can be modified as shown in the cross-sectional view provided in FIG. 6 to include a first resonator 82 and a second resonator 92 that essentially replaces mirror 80. This modified reflective element 50 contains partially reflective regions 94 and 96 on the inner surface of the front layer 84, and a highly reflective region 90 on the inner surface of the back layer 86. The reflectivity of region 90 is set to be 100%. The reflectivities of regions 94 and 96 can be varied to adjust the passband, isolation, and dispersion of the output waveforms. As illustrated in FIG. 6, part of the highly reflective region 90 overlays an additional layer of material 98, such as silicon dioxide. This additional layer 98 has a thickness of approximately $\lambda/4$ at the optical wavelength of interest.

The optical thickness of each resonator 82 and 92 is the physical thickness of the gap between the reflective regions multiplied by the refractive index of the material within the gap, such as air, plus the contributions from regions 84, 94, and 96. If the contributions from regions 84, 94, and 96 are substantially equal among resonators 82 and 92, the additional layer of material 98 causes the optical thickness of resonator 92 to be $\lambda/4$ less than the optical thickness of resonator 82. In other words, a single pass optical path length traveled by beam 32 propagating in resonator 92 is $\lambda/4$ less than a single pass optical path length traveled by beam 31 propagating in resonator 82 if the contributions from regions 84, 94, and 96 are substantially equal among resonators 82 and 92. Although FIG. 6 is illustrated with material 98 associated with resonator 92, it should be understood that the layer of material 98 could be deposited on the inner surface of back layer 86 of resonator 82 such that the optical thickness of resonator 82 is $\lambda/4$ less than the optical thickness of resonator 92.

In either circumstance, the difference in the optical thicknesses of the resonators 82 and 92 results in the center wavelength of resonator 92 being offset relative to the center wavelength of resonator 82 by approximately one half of the free spectral range (FSR) of both the resonators. The FSR of each resonator is defined as the period of the resonator's complex reflectivity. For example, if the free spectral range of both resonators is approximately 50 GHz, then the center wavelength of resonator 92 is offset by approximately 25 GHz relative to the center wavelength of resonator 82. This causes the resonance frequencies of resonator 92 to match that of the anti-resonance frequencies of resonator 82. This arrangement of the resonators' center wavelengths can significantly reduce chromatic dispersion in interferometer 5, while keeping a flat-top passband and good isolation among output signals 42 and 44.

Figure 7:
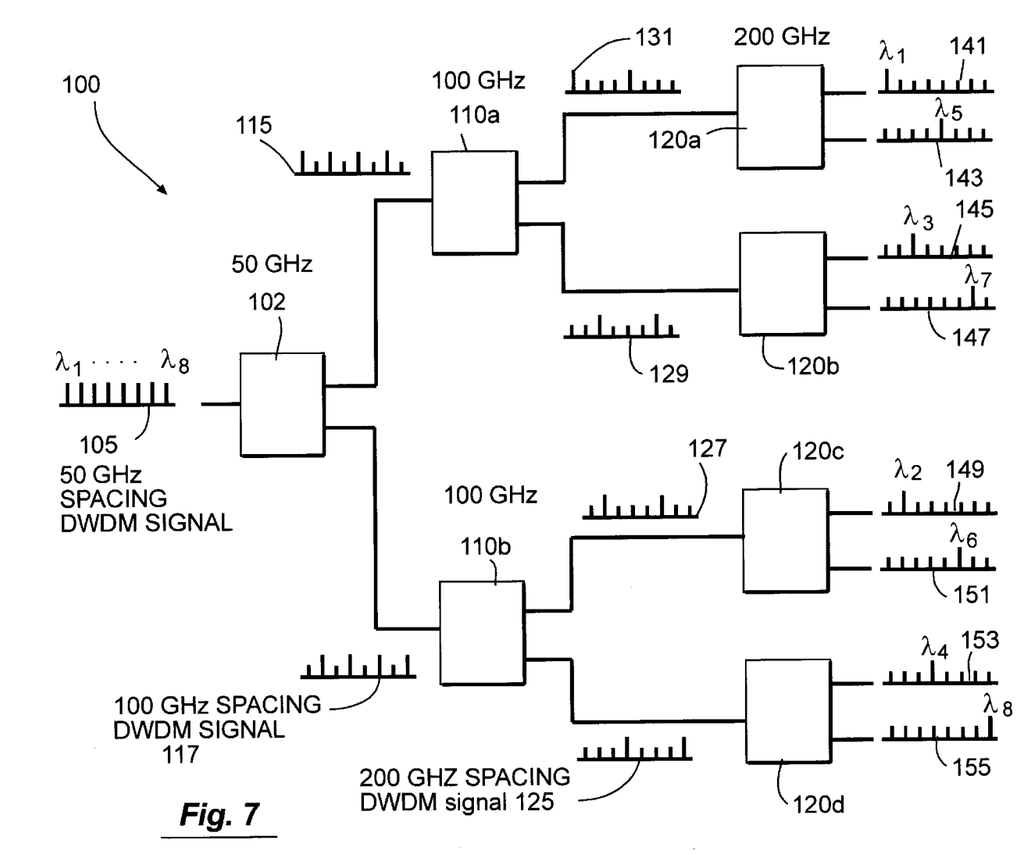
FIG. 7 illustrates a cascaded architecture of interferometers.

FIG. 7 illustrates a cascaded architecture 100 of optical filters. For example, a first stage of architecture 100 may include an optical filter 102. A second stage of architecture 100 may include optical filters 110a and 110b, which are collectively referred to as optical filters 110. Third stage of architecture 100 may include optical filters 120a, 120b, 120c, and 120d, which are collectively referred to as optical filters 120. Optical filters 102, 110, and 120 may comprise any combination and arrangement of optical filters that employ any suitable conventional optical filtering technology (e.g., fiber bragg gratings, thin film filters, arrayed waveguide grating, etc.) and any suitable embodiment of interferometer 5 illustrated in FIGS. 1–6.

In the particular embodiment illustrated in FIG. 7, filter 102 comprises a 50 GHz interferometer 5 that receives a 50 GHz spaced dense wavelength division multiplexed (DWDM) signal 105 and generates an odd-channel 100 GHz spacing DWDM signal 115 and an even channel 100 GHz spacing signal 117. Two 100 GHz filters 110a and 10b are used to produce a 200 GHz spaced signal 131 carrying wavelengths $\lambda_1$ and $\lambda_5$, a signal 129 carrying wavelengths $\lambda_3$ and $\lambda_7$, a signal 127 carrying wavelengths $\lambda_2$ and $\lambda_6$, and a signal 125 carrying wavelengths $\lambda_4$ and $\lambda_8$. A third stage of filters 120a–d are used to produce the individual channels $\lambda_1$ through $\lambda_8$ on outputs 141, 149, 145, 153, 143, 151, 147, and 155 respectively. Signals 115, 117, 125, 127, 129, and 131 may be referred to as intermediate input signals and/or intermediate output signals with respect to a particular filter 102, 110, or 120. By using one or more interferometers 5 in the cascaded architecture 100, the wavelength channel spacings of the signals are dynamically tunable. In some embodiments, the operation of the device significantly reduces chromatic dispersion while keeping a flat-top passband for each channel and good isolation among channels.

Although FIG. 7 illustrates architecture 100 having three stages of filters to demultiplex a DWDM signal 105 having eight wavelength channels, it is contemplated that architecture 100 may have any suitable number of stages to demultiplex a DWDM signal 105 having any suitable number of wavelength channels. Moreover, FIG. 7 is detailed with respect to demultiplexing a 50 GHz spaced DWDM signal 105 for illustrative purposes only. It is contemplated that a DWDM signal 105 having any suitable channel spacing (12.5 GHz, 50 GHz, 100 GHz, 200 GHz, etc.) may be processed by the architecture 100 of filters. Additionally, although the description of architecture 100 is detailed with respect to a demultiplexing function, it should be understood that it can also perform a multiplexing function upon individual wavelength channels to produce one or more DWDM signals.

Figure 8:
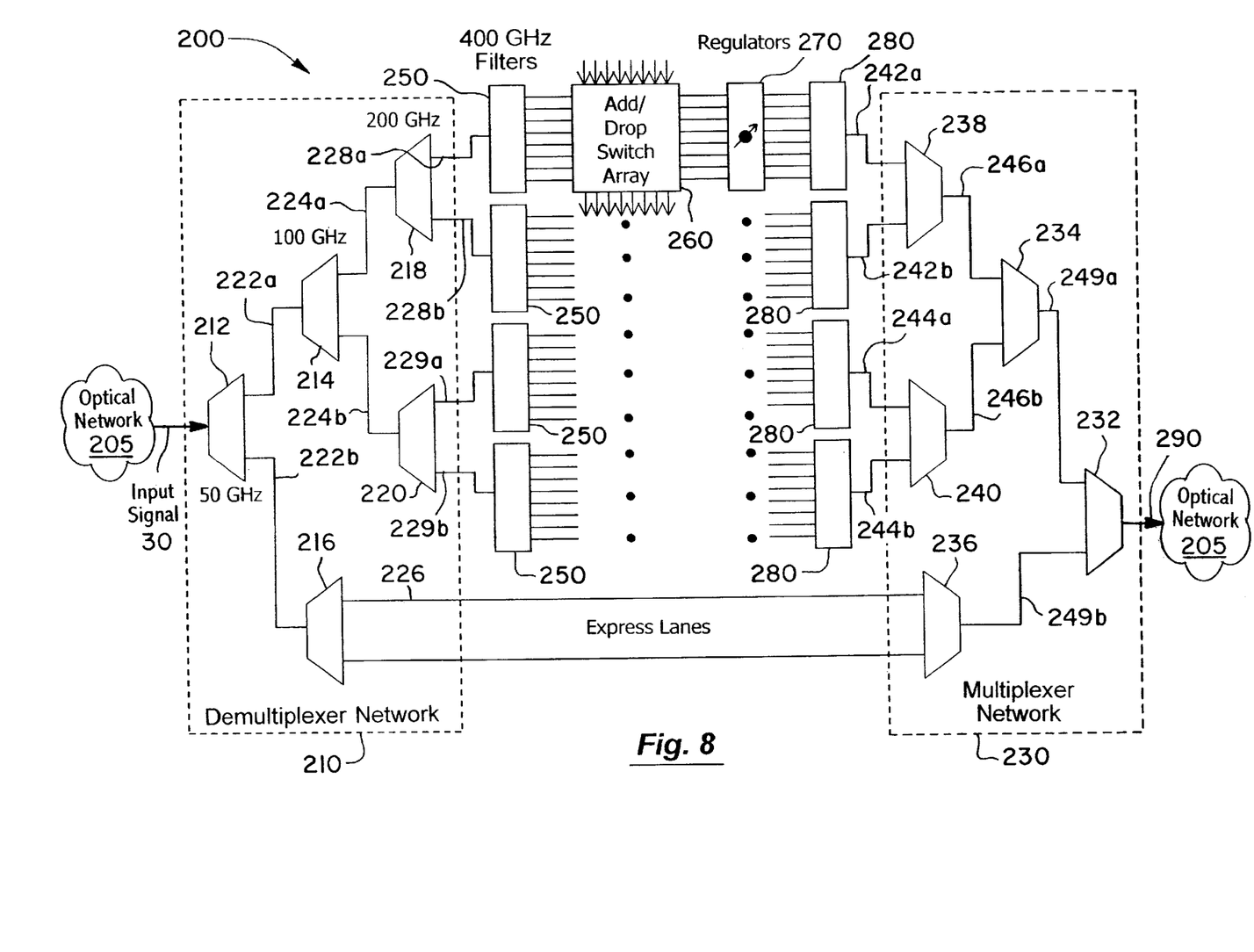
FIG. 8 illustrates an optical networking architecture using the interferometers.

FIG. 8 illustrates one embodiment of an optical networking architecture 200 that includes an optical network 205 coupled to a demultiplexer network 210, filters 250, switch fabrics 260, regulators 270, filters 280, and a multiplexer network 230. In general, any suitable embodiment of interferometer 5 illustrated in FIGS. 1–6 may be incorporated into architecture 200, such as in demultiplexer network 210 and/or multiplexer network 230. It should be understood that architecture 200 may be configured differently and/or may include additional or fewer components without departing from the scope of the present invention.

Optical network 205 comprises any combination and arrangement of routers, bridges, hubs, gateways, switches, multiplexers, demultiplexers, transmitters, amplifiers, receivers, couplers, isolators, circulators, filters, detectors, wavelength converters, add/drop devices, or any other appropriate optical networking components. Optical network 205 may include portions of a long-haul network, a metropolitan network, and/or a local/access network.

Demultiplexer network 210 and multiplexer network 230 each comprise an appropriate arrangement of filters. For example, demultiplexer network 210 comprises filters 212, 214, 216, 218, and 220. One or more of filters 212–220 may comprise any suitable embodiment of interferometer 5 illustrated in FIGS. 1–6 to perform a demultiplexing function. Similarly, multiplexer network 230 may comprise filters 232, 234, 236, 238, and 240. One or more of filters 232–240 may comprise any suitable embodiment of interferometer 5 illustrated in FIGS. 1–6 to perform a multiplexing function.

Filters 250 and 280 comprise gratings, Bragg gratings, Fiber gratings, Fiber Bragg gratings, Fabry-Perot filters, Thin-Film filters, interferometers, arrayed waveguide gratings, tunable filters, or any other optical device that process and differentiate among optical signals based upon wavelength.

Switch fabrics 260 comprise switches and/or routers. In one embodiment switch fabrics 260 comprise add/drop switch arrays. Regulators 270 comprise any suitable device that adjustably regulate the optical power level of an optical channel.

In operation, demultiplexer network 210 receives input signal 30 from network 205. Demultiplexer network 210 and filters 250 separate input signal 30 into an array of spatially separated wavelength channels. This is generally done by progressively demultiplexing input signal 30 into intermediate signals, such as, for example, intermediate signals 222a–b, 224a–b, 226, 228a–b, and 229a–b which may be referred to as intermediate input signals and/or intermediate output signals with respect to a particular filter 212, 214, 216, 218, and 220. By using one or more inteferometers 5 in demultiplexer network 210, the spacing of each spatially separated wavelength channel may be dynamically tuned. Moreover, depending upon the particular embodiment of interferometer 5 used, each wavelength channel may have a flat-top passband, good isolation from other channels, and low chromatic dispersion. Switch fabrics 260 process the spatially separated channels to perform a switching and/or routing function. In a particular embodiment, a switch fabric 260 may comprise an add/drop switch array that selectively routes channels from the input ports to its drop ports; substitutes channels from the add ports in place of the dropped channels; and routes the remaining input channels and the added channels to the output ports of the add/drop switch array. This combination of demultiplexer network 210, filters 250 and add/drop switch arrays 260 allows any combination of input channels to be replaced with any combination of add channels.

In one embodiment, the array of output channels from the switch fabrics 250 pass through regulators 270 which adjustably regulate the optical power level of each channel. In a particular embodiment, a selected subset of the channels associated with input signal 30 pass directly from demultiplexer network 210 to multiplexer network 230 in "express lanes." A second array of filters 280 and a multiplexing network 230 combine the output channels so that they can be transmitted as a DWDM output signal 290. This is generally done by progressively multiplexing into output signal 290 intermediate signals, such as, for example, intermediate signals 242*a–b*, 244*a–b*, 246*a–b*, 248, and 249*a–b* which may be referred to as intermediate input signals and/or intermediate output signals with respect to a particular filter 232, 234, 236, 238, and 240.

The above disclosure sets forth a number of embodiments of the present invention. Other arrangements or embodiments, not precisely set forth, could be practiced under the teachings of the present invention and as set forth in the following claims.

What is claimed is:

1. An apparatus for processing an optical signal, comprising:
   a tunable optical element operable to receive an input signal at an incidence angle and to separate the input signal into a first beam having a first optical path length and a second beam having a second optical path length, wherein the difference between the first optical path length and the second optical path length is based at least in part upon the incidence angle of the input signal; and
   a reflective element operable to reflect the first beam and the second beam such that the first beam interferes with the second beam to produce a first output signal and a second output signal, the first output signal comprising a first subset of wavelength channels from the input signal and the second output signal comprising a second subset of wavelength channels from the input signal.

2. The apparatus of claim 1, wherein the tunable optical element comprises:
   a first plate having a reflective region; and
   a second plate having a partially reflective region and arranged a predetermined distance from the first plate;
   wherein:
      the input signal is incident upon the partially reflective region of the second plate at the incidence angle to produce the first beam and the second beam;
      the first beam is processed to define at least a portion of the first optical path length; and
      the second beam is processed to define at least a portion of the second optical path length.

3. The apparatus of claim 2, wherein:
   the first beam is transmitted by the partially reflective region of the second plate toward the reflective element to define at least a portion of the first optical path length; and
   the second beam is reflected by the partially reflective region of the second plate and the reflective region of the first plate to define at least a portion of the second optical path length.

4. The apparatus of claim 2, wherein:
   the first beam is reflected by the partially reflective region of the second plate toward the reflective element to define at least a portion of the first optical path length; and
   the second beam is transmitted by the partially reflective region of the second plate and reflected by the reflective region of the first plate to define at least a portion of the second optical path length.

5. The apparatus of claim 2, wherein the first plate is arranged parallel to the second plate.

6. The apparatus of claim 2, wherein the distance between the first plate and the second plate is based upon a predetermined difference between the first optical path length and the second optical path length.

7. The apparatus of claim 2, wherein the incidence angle of the input signal is adjusted to tune the difference between the first optical path length and the second optical path length.

8. The apparatus of claim 7, wherein the incidence angle is adjusted by adjusting the optical path of the input signal with respect to the tunable optical element.

9. The apparatus of claim 7, wherein the incidence angle is adjusted by rotating the tunable optical element with respect to the optical path of the input signal.

10. The apparatus of claim 2, wherein:
    a portion of the distance between the first plate and the second plate is filled by a material having a particular index of refraction; and
    the difference between the first optical path length and the second optical path length is based in part upon the index of refraction of the material.

11. The apparatus of claim 10, wherein the index of refraction is adjusted to tune the difference between the first optical path length and the second optical path length.

12. The apparatus of claim 2, wherein:
    the reflective element reflects the first beam and the second beam back toward the tunable optical element; and
    the first beam interferes with the second beam at the partially reflective region to introduce a phase shift between the first beam and the second beam.

13. The apparatus of claim 2, wherein:
    the reflective element comprises a resonator having an optical thickness; and
    the distance between the first plate and the second plate is based in part upon the optical thickness of the resonator.

14. The apparatus of claim 2, wherein the tunable optical element comprises a first tunable optical element, the reflective element comprises a first reflective element, and the input signal comprises a first input signal, the apparatus further comprising:
    a second tunable optical element operable to receive a second input signal at an incidence angle and to separate the second input signal into a third beam having a third optical path length and a fourth beam having a fourth optical path length, wherein the difference between the third optical path length and the fourth optical path length is based in part upon the incidence angle of the second input signal; and
    a second reflective element operable to reflect the third beam and the fourth beam such that the third beam interferes with the fourth beam to produce a third output signal and a fourth output signal, the third output signal comprising a first subset of wavelength channels from the second input signal and the fourth output signal comprising a second subset of wavelength channels from the second input signal.

15. The apparatus of claim 14, wherein the second input signal comprises one of the first output signal and the second output signal associated with the first tunable optical element.

16. The apparatus of claim 15, further comprising a wavelength multiplexer operable to combine at least the third and fourth output signals into an output wavelength division multiplexed signal.

17. The apparatus of claim 1; wherein:
    the first beam emitted by the tunable optical element follows a first optical path toward the reflective element;
    the second beam emitted by the tunable optical element follows a second optical path toward the reflective element; and the first optical path is substantially parallel with the second optical path.

18. The apparatus of claim 1, wherein the difference between the first optical path length and the second optical path length is substantially independent from the distance between the tunable optical element and the reflective element.

19. The apparatus of claim 1, wherein:
the input signal comprises an input spectral band;
the first output signal comprises a first subset of the input spectral band; and
the second output signal comprises a second subset of the input spectral band that is complementary to the first subset of the input spectral band.

20. The apparatus of claim 19, wherein:
the input signal comprises a WDM signal comprising a plurality of wavelength channels;
the first subset of the input spectral band comprises even wavelength channels; and
the second subset of the input spectral band comprises odd wavelength channels.

21. The apparatus of claim 1, wherein adjusting the difference between the first optical path length and the second optical path length adjusts the spacing between the wavelength channels associated with the first output signal and the second output signal.

22. The apparatus of claim 1, wherein the reflective element comprises a mirror operable to reflect back to the tunable optical element the first beam and the second beam.

23. The apparatus of claim 1, wherein the reflective element comprises:
a mirror operable to reflect back to the tunable optical element one of the first beam and the second beam; and
a resonator operable to reflect back to the tunable optical element the other of the first beam and the second beam.

24. The apparatus of claim 23, wherein the resonator comprises a Gires-Tournois resonator.

25. The apparatus of claim 1, wherein the reflective element comprises:
a first resonator operable to reflect back to the tunable optical element one of the first beam and the second beam; and
a second resonator operable to reflect back to the tunable optical element the other of the first beam and the second beam.

26. The apparatus of claim 25, wherein:
the first resonator has a first center wavelength; and
the second resonator has a second center wavelength that is offset relative to the first center wavelength by approximately one half of the free spectral range of the first resonator such that the resonance frequencies of the second resonator are matched to the anti-resonance frequencies of the first resonator.

27. The apparatus of claim 25, wherein:
the first resonator has a partially reflective front surface and a highly reflective back surface spaced a first optical thickness from the front surface;
the second resonator has a partially reflective front surface and a highly reflective back surface spaced a second optical thickness from the front surface; and
the difference between the optical thicknesses of the first and second resonators is approximately equal to one-quarter wavelength.

28. The apparatus of claim 27, wherein the first optical thickness is selected to produce a desired center frequency and free-spectral range such that even wavelength channels in the input signal are included in the first output signal and odd wavelength channels in the input signal are included in the second output signal.

29. The apparatus of claim 1, wherein the tunable optical element comprises a first tunable optical element, the reflective element further comprising a second tunable optical element.

30. The apparatus of claim 29, wherein the second tunable optical element comprises:
a first plate having a partially reflective region; and
a second plate having a reflective region and arranged a predetermined distance from the first plate;
wherein the first beam interferes with the second beam at the partially reflective region to introduce a phase shift between the first beam and the second beam.

31. The apparatus of claim 30, wherein:
the first beam is incident upon the partially reflective region to define at least a portion of the first optical path length; and
the second beam is reflected by the reflective region toward the partially reflective region to define at least a portion of the second optical path length.

32. The apparatus of claim 30, wherein the distance between the first plate and the second plate is based upon a predetermined difference between the first optical path length and the second optical path length.

33. The apparatus of claim 30, wherein the second tunable optical element is rotatable to adjust the difference between the first optical path length and the second optical path length.

34. The apparatus of claim 30, wherein:
a portion of the distance between the first plate and the second plate is filled by a material having a particular index of refraction; and
the difference between the first optical path length and the second optical path length is based in part upon the index of refraction of the material.

35. The apparatus of claim 34, wherein the index of refraction is adjusted to tune the difference between the first optical path length and the second optical path length.

36. The apparatus of claim 1 further comprising a demultiplexer operable to process the first output signal to produce a third output signal and a fourth output signal, wherein the third output signal comprises a third subset of wavelength channels and the fourth output signal comprises a fourth subset of wavelength channels.

37. The apparatus of claim 36 wherein a plurality of transmission peaks associated with at least the first subset of wavelength channels are flatter and more isolated than a plurality of transmission peaks associated with at least the third subset of wavelength channels.

38. The apparatus of claim 36 wherein the demultiplexer comprises a selected one of an arrayed waveguide device, a diffraction grating device, a fiber Bragg grating device, a thin-film interference filter, or a second tunable optical element communicatively coupled to a second reflective element.

39. The apparatus of claim 36 wherein a plurality of transmission peaks associated with at least the first subset of wavelength channels are flatter than a plurality of transmission peaks associated with at least the third subset of wavelength channels.

40. The apparatus of claim 36 wherein a plurality of transmission peaks associated with at least the first subset of wavelength channels exhibit higher isolation than a plurality of transmission peaks associated with at least the third subset of wavelength channels.

41. A method for processing an input optical signal, comprising:

receiving an input signal at an incidence angle;

separating the input signal into a first beam having a first optical path length and a second beam having a second optical path length, wherein the difference between the first optical path length and the second optical path length is based at least in part upon the incidence angle of the input signal;

interfering the first beam with the second beam to produce a first output signal and a second output signal, the first output signal comprising a first subset of wavelength channels from the input signal and the second output signal comprising a second subset of wavelength channels from the input signal.

42. The method of claim 41, wherein separating the input signal comprises:

transmitting a first portion of the input signal to generate the first beam; and reflecting a second portion of the input signal to generate the second beam.

43. The method of claim 42, wherein reflecting a second portion of the input signal comprises:

reflecting a second portion of the input signal at a partially reflective interface to generate the second beam; and reflecting the second beam at a totally reflective interface such that the second beam and the first beam propagate along substantially parallel optical paths.

44. The method of claim 43, wherein:

the partially reflective interface is associated with a first plate;

the totally reflective interface is associated with a second plate; and the distance between the first plate and the second plate is based upon a predetermined difference between the first optical path length and the second optical path length.

45. The method of claim 44, wherein:

a portion of the distance between the first plate and the second plate is filled by a material having a particular index of refraction; and the difference between the first optical path length and the second optical path length is based in part upon the index of refraction of the material.

46. The method of cliam 45, further comprising adjusting the index of refraction to tune the difference between the first optical path length and the second optical path length.

47. The method of claim 41, further comprising adjusting the incidence angle of the input signal to tune the difference between the first optical path length and the second optical path length.

48. The method of claim 47, wherein adjusting the incidence angle comprises adjusting the optical path of the input signal.

49. The method of claim 41, wherein interfering the first beam with the second beam comprises introducing a phase shift between the first beam and the second beam.

50. The method of claim 41, wherein:

the input signal comprises an input spectral band;

the first output signal comprises a first subset of the input spectral band; and the second output signal comprises a second subset of the input spectral band that is complementary to the first subset of the input spectral band.

51. The method of claim 50, wherein:

the input signal comprises a WDM signal comprising a plurality of wavelength channels;

the first subset of the input spectral band comprises even wavelength channels; and the second subset of the input spectral band comprises odd wavelength channels.

52. The method of claim 41, further comprising adjusting the difference between the first optical path length and the second optical path length to adjust the spacing between the wavelength channels associated with the first output signal and the second output signal.

53. The method of claim 41, further comprising reflecting the first beam and the second beam using a mirror.

54. The method of claim 41, further comprising:

reflecting one of the first beam and the second beam using a mirror; and reflecting the other of the first beam and the second beam using a resonator.

55. The method of claim 41, further comprising:

reflecting one of the first beam and the second beam using a first resonator; and reflecting the other of the first beam and the second beam using a second resonator.

56. The method of claim 55, wherein:

the first resonator has a first center wavelength; and the second resonator has a second center wavelength that is offset relative to the first center wavelength by approximately one half of the free spectral range of the first resonator such that the resonance frequencies of the second resonator are matched to the anti-resonance frequencies of the first resonator.

57. The method of claim 55, wherein:

the first resonator has a partially reflective front surface and a highly reflective back surface spaced a first optical thickness from the front surface;

the second resonator has a partially reflective front surface and a highly reflective back surface spaced a second optical thickness from the front surface; and the difference between the optical thicknesses of the first and second resonators is approximately equal to one-quarter wavelength.

58. The method of claim 41, further comprising:

processing the first output signal to generate a third output signal and a fourth output signal;

wherein the third output signal comprises a first subset of wavelength channels from the first output signal and the fourth output signal comprises a second subset of wavelength channels from the first output signal.

59. The method of claim 41 further comprising demultiplexing the first optical signal to produce a third output signal and a fourth output signal, wherein the third output signal comprises a third subset of wavelength channels and the fourth output signal comprises a fourth subset of wavelength channels.

60. The method of claim 59 wherein a plurality of transmission peaks associated with at least the first subset of wavelength channels are flatter and more isolated than a plurality of transmission peaks associated with at least the third subset of wavelength channels.

61. The method of claim 59 wherein the step of demultiplexing the first optical signal is performed by a selected one of an arrayed waveguide device, a diffraction grating device, a fiber Bragg grating device, or a thin-film interference filter.

62. The method of claim 59 wherein a plurality of transmission peaks associated with at least the first subset of wavelength channels are flatter than a plurality of transmission peaks associated with at least the third subset of wavelength channels.

63. The method of claim 59 wherein a plurality of transmission peaks associated with at least the first subset of wavelength channels exhibit higher isolation than a plurality of transmission peaks associated with at least the third subset of wavelength channels.

64. An optical system, comprising a demultiplexer network operable to demultiplex an input WDM signal into a plurality of wavelength channels, the demultiplexer network comprising:

a tunable optical element operable to receive an intermediate input signal at an incidence angle and to separate the intermediate input signal into a first beam having a first optical path length and a second beam having a second optical path length, wherein the difference between the first optical path length and the second optical path length is based at least in part upon the incidence angle of the intermediate input signal; and a reflective element operable to reflect the first beam and the second beam such that the first beam interferes with the second beam to produce a first intermediate output signal and a second intermediate output signal, the first intermediate output signal comprising a first subset of wavelength channels from the intermediate input signal and the second output signal comprising a second subset of from the intermediate input signal.

65. The system of claim 64, wherein the tunable optical element comprises:

a first plate having a reflective region; and a second plate having a partially reflective region and arranged a predetermined distance from the first plate;

wherein:

the intermediate input signal is incident upon the partially reflective region of the second plate at the incidence angle to produce the first beam and the second beam;

the first beam is processed to define at least a portion of the first optical path length; and the second beam is processed to define at least a portion of the second optical path length.

66. The system of claim 65, wherein:

the first beam is transmitted by the partially reflective region of the second plate toward the reflective element to define at least a portion of the first optical path length; and the second beam is reflected by the partially reflective region of the second plate and the reflective region of the first plate to define at least a portion of the second optical path length.

67. The system of claim 65, wherein:

the first beam is reflected by the partially reflective region of the second plate toward the reflective element to define at least a portion of the first optical path length; and the second beam is transmitted by the partially reflective region of the second plate and reflected by the reflective region of the first plate to define at least a portion of the second optical path length.

68. The system of claim 65, wherein the first plate is arranged parallel to the second plate.

69. The system of claim 65, wherein the distance between the first plate and the second plate is based upon a predetermined difference between the first optical path length and the second optical path length.

70. The system of claim 65, wherein the incidence angle of the intermediate input signal is adjusted to tune the difference between the first optical path length and the second optical path length.

71. The system of claim 70, wherein the incidence angle is adjusted by adjusting the optical path of the intermediate input signal with respect to the tunable optical element.

72. The system of claim 70, wherein the incidence angle is adjusted by rotating the tunable optical element with respect to the optical path of the intermediate input signal.

73. The system of claim 65, wherein:

a portion of the distance between the first plate and the second plate is filled by a material having a particular index of refraction; and the difference between the first optical path length and the second optical path length is based in part upon the index of refraction of the material.

74. The system of claim 73, wherein the index of refraction is adjusted to tune the difference between the first optical path length and the second optical path length.

75. The system of claim 65, wherein:

the reflective element comprises a resonator having an optical thickness; and the distance between the first plate and the second plate is based in part upon the optical thickness of the resonator.

76. The system of claim 64, wherein:

the first beam emitted by the tunable optical element follows a first optical path toward the reflective element;

the second beam emitted by the tunable optical element follows a second optical path toward the reflective element; and the first optical path is substantially parallel with the second optical path.

77. The system of claim 64, wherein the difference between the first optical path length and the second optical path length is substantially independent from the distance between the tunable optical element and the reflective element.

78. The system of claim 65, wherein:

the reflective element reflects the first beam and the second beam back toward the tunable optical element; and the first beam interferes with the second beam at the partially reflective region to introduce a phase shift between the first beam and the second beam.

79. The system of claim 64, wherein:

the intermediate input signal comprises an input spectral band;

the first intermediate output signal comprises a first subset of the input spectral band; and the second intermediate output signal comprises a second subset of the input spectral band that is complementary, to the first subset of the input spectral band.

80. The system of claim 79, wherein:

the intermediate input signal comprises a plurality of wavelength channels associated with the input WDM signal;

the first subset of the input spectral band comprises even wavelength channels; and the second subset of the input spectral band comprises odd wavelength channels.

81. The system of claim 64, wherein adjusting the difference between the first optical path length and the second optical path length adjusts the spacing between the wavelength channels associated with the first intermediate output signal and the second intermediate output signal.

82. The system of claim 64, wherein the reflective element comprises a mirror operable to reflect back to the tunable optical element the first beam and the second beam.

83. The system of claim 64, wherein the reflective element comprises:

a mirror operable to reflect back to the tunable optical element one of the first beam and the second beam; and a resonator operable to reflect back to the tunable optical element the other of the first beam and the second beam.

84. The system of claim 83, wherein the resonator comprises a Gires-Tournois resonator.

85. The system of claim 64, wherein the reflective element comprises:

a first resonator operable to reflect back to the tunable optical element one of the first beam and the second beam; and a second resonator operable to reflect back to the tunable optical element the other of the first beam and the second beam.

86. The system of claim 85, wherein:

the first resonator has a first center wavelength; and the second resonator has a second center wavelength that is offset relative to the first center wavelength by approximately one half of the free spectral range of the first resonator such that the resonance frequencies of the second resonator are matched to the anti-resonance frequencies of the first resonator.

87. The system of claim 85, wherein:

the first resonator has a partially reflective front surface and a highly reflective back surface spaced a first optical thickness from the front surface;

the second resonator has a partially reflective front surface and a highly reflective back surface spaced a second optical thickness from the front surface; and the difference between the optical thicknesses of the first and second resonators is approximately equal to one-quarter wavelength.

88. The system of claim 87, wherein the first optical thickness is selected to produce a desired center frequency and free-spectral range such that even wavelength channels in the intermediate input signal are included in the first intermediate output signal and odd wavelength channels in the intermediate input signal are included in the second intermediate output signal.

89. The system of claim 64, wherein the tunable optical element comprises a first tunable optical element, the reflective element further comprising a second tunable optical element.

90. The system of claim 89, the second tunable optical element comprises:

a first plate having a partially reflective region; and a second plate having a reflective region and arranged a predetermined distance from the first plate;

wherein the first beam interferes with the second beam at the partially reflective region to introduce a phase shift between the first beam and the second beam.

91. The system of claim 90, wherein:

the first beam is incident upon the partially reflective region to define at least a portion of the first optical path length; and the second beam is reflected by the reflective region toward the partially reflective region to define at least a portion of the second optical path length.

92. The system of claim 90, wherein the distance between the first plate and the second plate is based upon a predetermined difference between the first optical path length and the second optical path length.

93. The system of claim 90, wherein the second tunable optical element is rotatable to adjust the difference between the first optical path length and the second optical path length.

94. The system of claim 90, wherein:

a portion of the distance between the first plate and the second plate is filled by a material having a particular index of refraction; and the difference between the first optical path length and the second optical path length is based in part upon the index of refraction of the material.

95. The system of claim 94, wherein the index of refraction is adjusted to tune the difference between the first optical path length and the second optical path length.

96. The system of claim 64, further comprising multiplexer network operable to multiplex a portion of the wavelength channels to generate an output WDM signal.

97. The system of claim 96, further comprising an optical component communicatively coupled to the demultiplexer network and the multiplexer network, the optical component operable to process a portion of the wavelength channels.

98. The system of claim 96 further comprising a switch fabric communicatively coupled to the demultiplexer network.

99. The system of claim 98 wherein the switch fabric comprises an add/drop switch array comprising a plurality of input ports, add ports, drop ports, and output ports, the add/drop switch array operable to:

route wavelength channels from the input ports to the drop ports;

substitute wavelength channels from the add ports in place of the dropped wavelength channels; and route wavelength channels from at least one of the input ports and the add ports to the output ports.

100. The system of claim 98 further comprising express lanes operable to communicate wavelength channels received from the demultiplexer network, wherein the multiplexer network is operable to receive wavelength channels from the switch fabric and the express lanes.

* * * * *